J. B. WARING.
SPEED INDICATOR.
APPLICATION FILED DEC. 7, 1907.
944,709.
Patented Dec. 28, 1909.
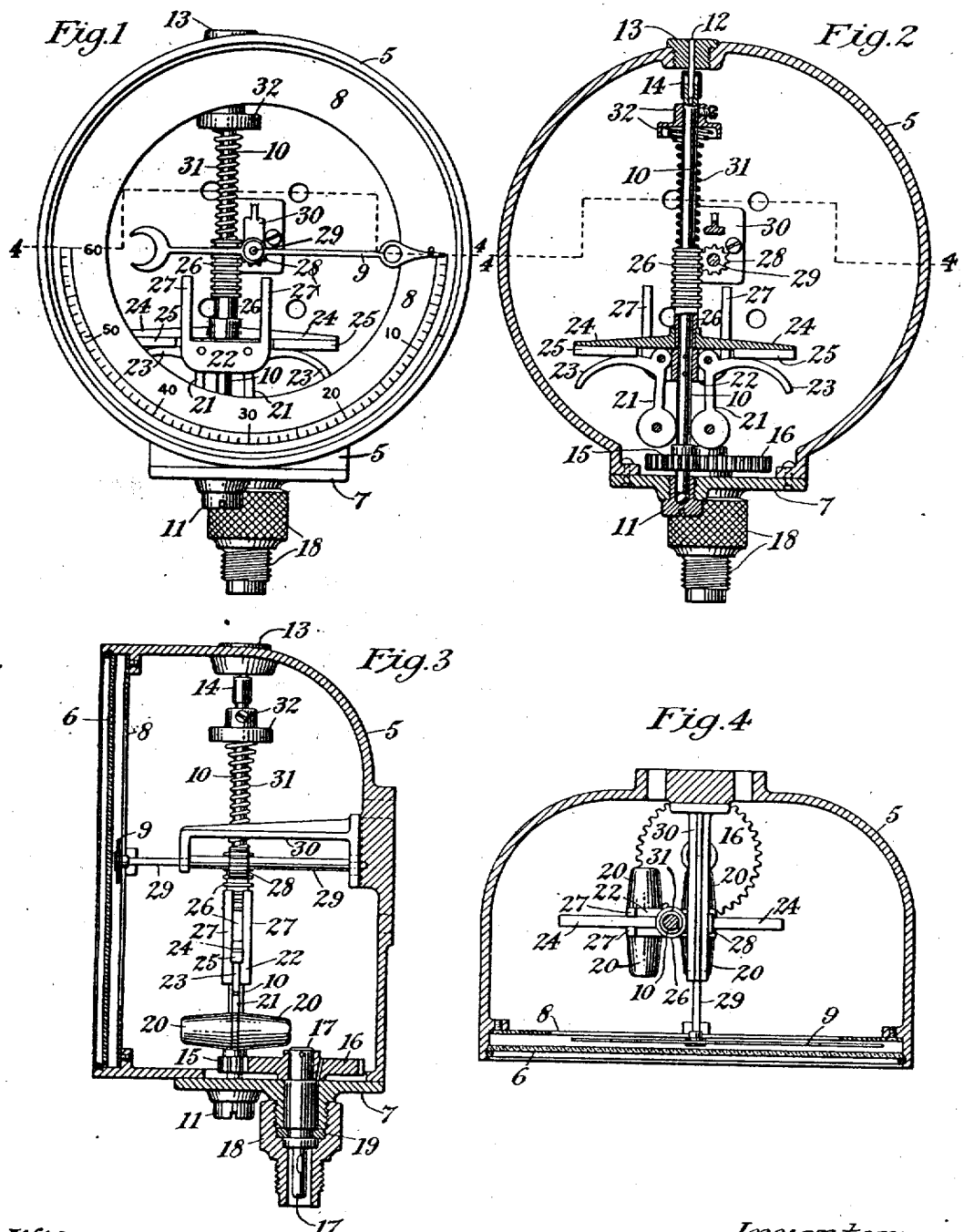

UNITED STATES PATENT OFFICE.

JOHN B. WARING, OF JERSEY CITY, NEW JERSEY, ASSIGNOR OF ONE-FOURTH TO FRANK S. SANCHEZ, OF BROOKLYN, NEW YORK, AND ONE-FOURTH TO FERNANDO RODRIGUEZ, OF PORT CHESTER, NEW YORK.

SPEED-INDICATOR.

944,709.

Specification of Letters Patent.

Patented Dec. 28, 1909.

Application filed December 7, 1907. Serial No. 405,601.

*To all whom it may concern:*

Be it known that I, JOHN B. WARING, a citizen of the United States, residing at Jersey City, in the county of Hudson and State of New Jersey, have invented a certain new and useful Improvement in Speed-Indicators, of which the following is a specification, reference being had therein to the accompanying drawings, forming part thereof.

My invention relates to speed indicators, and the general objects of my invention are accuracy of indication together with simplicity of construction and economy of manufacture.

Other objects and advantages will be apparent from the following description.

My invention includes a compensating cam or wiper cam which forms an operative connection between a centrifugal body and the speed-indicating means, and also includes various features of construction and combination of parts, as hereinafter described.

I will now describe the means embodying my invention which are illustrated in the accompanying drawings and will thereafter point out my invention in claims.

Figure 1 is a front elevation of a complete speed indicator. Fig. 2 is a front elevation in section. Fig. 3 is a median vertical section viewed from the right of Figs. 1 and 2. Fig. 4 is a sectional plan on the line 4—4 of Figs. 1 and 2.

The embodiment of my invention shown in the drawings comprises a metal case or inclosing box 5 which is provided with a glass front plate or crystal 6 and with a bottom plate or closure 7. A ring-shaped face or annular dial 8 is fixed in the case near the crystal 6 but spaced inwardly therefrom, and is provided throughout its lower half as shown with a scale of uniform gradations or having equidistantly spaced markings. The markings on the scale may indicate revolutions per given interval of time, for instance, per minute, or such scale markings may indicate distance traveled by a vehicle in a given interval of time, for example, miles per hour, and it is this latter indication that is illustrated in the drawings, the instrument shown being designed to indicate the speed or rate of travel of a vehicle. A pointer or index 9 coöperates with the dial 8 to indicate the rate of travel of the vehicle. Centrifugal means are provided to move the hand 9 over the dial 8 and such centrifugal means are carried by a rotating shaft 10 mounted in bearings in the case 5. At its bottom the shaft 10 is shown as stepped into a screw cup 11, screwing into the bottom plate 7, and containing a ball forming a thrust bearing which supports the weight of the shaft 10 and of the parts carried thereby. At its top end the shaft 10 is bored out or provided with a socket and rotates on a pin or pivot 12 carried by a screw plug 13 threaded into the case 5. The top end of the shaft 10 is provided with a cap or grease cup 14 for containing lubricant for the shaft bearing.

The shaft 10 is operatively connected or coupled to the wheel of the vehicle or other moving part whose speed it is desired to know. The coupling means shown comprise a pinion 15 fixed on the shaft 10 and a gear wheel 16 meshing therewith. The gear 16 is shown as pinned on a stub shaft 17 having a bearing in the plate 7 and extending to the outside of the casing 5, where it may be connected with any driving means, for example, a flexible shaft. The stub shaft 17 is retained in place by a screw cap 18 and retaining ring 19. The outer portion of the cap 18 is provided with screw threads and forms a nipple for the attachment of a cover or sheath, of any form, for the driving means which may be connected to the stub shaft 17.

The centrifugal means for actuating the pointer 9 comprise centrifugal bodies or weights 20 carried by arms 21. The arms 21 are pivoted to a collar-block or governor head 22 pinned fast on the shaft 10. The pivots of the arms 21 are disposed perpendicular to a plane occupied by the axis of the shaft 10; whereby the weights 20 and arms 21 are adapted to swing in a plane coincident with the axis of the shaft 10.

Means are provided for communicating the centrifugal movement of the weights 20 to the hand or pointer 9 at a rate or in a ratio corresponding to the uniform scale indications on the dial 8. Such means comprise wiper cams or compensating cams 23, shown as curved levers formed integral with the arms 21 and extending substantially at right angles therefrom. The pivots of the arms 21 and the pivots of the cams or wipers 23 are coincident or identical with each other, and the active cam surfaces of the cams 23 are located or disposed in planes parallel to the axes of the pivots of the cams 23. The contour or configuration of the upper convexly curved cam surfaces determines the extent of movement imparted to the pointer 9, and the contour of these cam faces is made such as to move the pointer 9 uniform distances over the scale corresponding to equal rates of increase in speed of rotation of the shaft 10 and therefore corresponding to equal rates of increase in miles per hour traveled by the vehicle, as indicated on the scale of the dial 8.

The cams or wipers 23 coact with toes 24 which are formed integral with each other. The toes 24 are provided with toe pieces or contact pieces 25, having plane contact surfaces, as indicated in the drawings, and preferably of hard wood, for example, maple. The lower faces of the toe pieces 25 at the points of contact with the cams 23 should be lubricated with some non-liquid lubricant, for example, graphite. The toes 24 are fixed on the lower end of a circumferentially toothed sleeve or circular rack 26 mounted to slide longitudinally on the shaft 10. Means are provided to compel the toes 24 and rack 26 to rotate with the shaft 10. Such means comprise legs or yokes 27 formed integral with and upstanding from the collar-block 22 and serving as guides for the toes 24. The circular rack 26 coacts with a pinion 28 fixed on an arbor or countershaft 29. The arbor 29 has bearings in a supporting bracket 30 attached by screws to the back of the case 5. The arbor 29 at its forward or outer end carries the hand or pointer 9. As the centrifugal bodies or weights 20 move outwardly from the shaft 10 under the influence of centrifugal force the cams or wipers 23 will raise the toes 24 and circular rack 26 and the rack 26 will rotate the pinion 28, arbor 29 and pointer 9.

Means are provided for resisting or opposing the centrifugal movement of the weights 20 and for returning the various parts, including the pointer 9, toward their initial positions. Such means comprise a coiled or spiral thrust spring 31 surrounding the shaft 10 and acting between the upper end of the rack 26 and a cup-shaped collar 32 forming an abutment and fixed, by a set screw, on the shaft 10 near its upper end.

The variable lever arms 23 and the toes 24, coacting with the rack 26 and the supporting arms 21, constitute multiplying means interposed between the centrifugal weights 20 and the spring 31 and adapted to gradually increase the effective resistance of the spring 31 to the centrifugal movement of the weights 20. As the speed of rotation increases and impels the weights 20 centrifugally, the points of contact between the convexly curved levers 23 and the plane contact surfaces of the contact pieces 25 will advance outward and away from vertical lines passing respectively through the axes of the pivots of the levers 23. This is occasioned by the rocking or rolling of the convexly curved levers 23 on the contact pieces 25 and results in the toes 24 being lifted by successively longer and longer lever arms, thereby gradually increasing the effective resistance of the spring 31 to the centrifugal movement of the weights 20, whereby the centrifugal weights move successively through smaller and smaller arcs for corresponding equal rates of increase in rotative speed. In the embodiment of the invention illustrated in the drawings, the levers 23 are virtually or in active length substantially three times as long at the position of highest speed indication as at that of the lowest speed indication or beginning of indication from a state of rest as shown in the drawings. At high speeds the centrifugal force is so strong that there is no necessity for the weights to move through large amplitudes, while a larger amplitude of movement at lower speeds contributes to delicacy of indication at such lower speeds.

To further provide for the indication of very low vehicle speeds without the necessity of gearing up the shaft 10 to run at a high speed, the spring 31 is made of a form or shape that will offer very slight initial resistance and that will oppose comparatively slight resistance during or throughout the first few or for about the first five miles of dial indication, after which the spring opposes a stronger resistance than would occur from the gradual increase in tension of an ordinary spring. To this end the spring 31 is provided at its upper end with a number of larger and therefore correspondingly more flexible or more easily yieldable coils. The coils are gradually increased in diameter so as to give to the upper end of the spring the form of an inverted cone or to cause it to flare outwardly, the remainder of the coils being of substantially uniform diameter. The outer or uppermost coil fits into the cup of the collar 32 and is centered or retained in position thereby. At low speeds the larger flexible coils offer the required slight resistance to render the instrument accurately operative at such low speeds. When the speed becomes higher the larger coils will be closed together within the cup of the collar 32 so that the stiffer smaller coils of the cylindrical portions of the spring are brought into action. When the larger end coils are closed together against the abutment or collar 32 the active or effective length of the spring as a whole is shortened, the small stiff coils only then being in action. The great centrifugal force at high speeds renders it both unnecessary and mechanically undesirable that the resisting spring should then be weak or easily yieldable.

The graduated spring 31 and the variable lever arms 23 combine to produce accuracy of indication at all speeds within the range of the instrument.

The contour of the upper or active faces or surfaces of the wipers 23 is made such that the centrifugal force of the weights 20 will exactly balance the opposing force of the spring 31 at each of the equidistantly spaced scale markings at the speed indicated. This result may be secured by grinding or otherwise dressing the cam surfaces to the required shape.

It is obvious that various modifications may be made in the construction shown and above particularly described within the principle and scope of my invention.

I claim:—

1. A speed indicator comprising a rotating shaft, rotatively balanced centrifugal weights, arms supporting the weights, means for pivotally connecting the arms with the shaft, the axes of the pivots being substantially at right angles to a plane occupied by the axis of the shaft, a rack slidable longitudinally on the shaft, toes adapted to actuate the rack, levers carried by the arms and provided with convexly curved faces rocking on the surfaces of the toes to actuate the toes, speed-indicating means adapted to be actuated by the rack, and a spring acting on the rack to resist the centrifugal force of the weights.

2. A speed indicator comprising a rotating shaft, rotatively balanced centrifugal weights, arms supporting the weights, means for pivotally connecting the arms with the shaft, the axes of the pivots being substantially perpendicular to a plane occupied by the axis of the shaft, wipers carried by the arms, a rack slidable longitudinally on the shaft, toes carried by the rack and adapted to coact with the wipers, the means for connecting the arms with the shaft also including means for compelling the rack and the toes to rotate with the shaft, speed-indicating means adapted to be actuated by the rack, and a coiled thrust spring surrounding the shaft and acting on the rack to resist the centrifugal force of the weights.

3. A speed indicator comprising a rotating shaft, rotatively balanced centrifugal weights, arms supporting the weights, means for pivotally connecting the arms with the shaft, the axes of the pivots being substantially perpendicular to a plane occupied by the axis of the shaft, wipers carried by the arms, a cylindrical rack slidable longitudinally on the shaft, toes carried by the rack and adapted to coact with the wipers, the means for connecting the arms with the shaft also including means for compelling the toes and the rack to rotate with the shaft, a pinion coactive with the rack, an index actuated by the pinion, and a coiled thrust spring surrounding the shaft and acting on the rack to resist the centrifugal force of the weights.

4. A speed indicator comprising a rotating shaft, rotatively balanced centrifugal weights, arms supporting the weights, means for pivotally connecting the arms with the shaft, the axes of the pivots being substantially perpendicular to a plane occupied by the axis of the shaft, wipers carried by the arms, a cylindrical rack slidable longitudinally on the shaft, toes carried by the rack and adapted to coact with the wipers, the means for connecting the arms with the shaft also including means for compelling the toes and the rack to rotate with the shaft, a pinion coactive with the rack, an index actuated by the pinion, and a coiled thrust spring surrounding the shaft and acting on the rack to resist the centrifugal force of the weights, such spring flaring outward toward one of its ends to form a more flexible portion.

5. A speed indicator comprising a rotating shaft, a governor-head fixed on the shaft, rotatively balanced centrifugal weights, arms supporting the weights and pivoted on the governor-head, the axes of the pivots being substantially at right angles to a plane occupied by the axis of the shaft, wipers carried by the arms, a cylindrical rack slidable longitudinally on the shaft, toes carried by the rack and adapted to coact with the wipers, the governor-head being provided with means for compelling the toes and the rack to rotate with the shaft, a pinion coactive with the rack, an index actuated by the pinion, a spring-retaining collar fixed on the shaft, and a coiled thrust spring surrounding the shaft and acting between the collar and the rack to press the toes toward the wipers and to resist the centrifugal force of the weights, such spring flaring outward toward one of its ends to form a more easily yieldable portion.

6. A speed indicator comprising a rotating shaft, a governor-head fixed on the shaft, rotatively balanced centrifugal weights, arms supporting the weights and pivoted on the governor-head, the axes of the pivots being substantially at right angles to a plane occupied by the axis of the shaft, wipers carried by the arms, a cylindrical rack slidable longitudinally on the shaft, toes carried by the rack and adapted to coact with the wipers, guides extending from the governor-head and engaging laterally with the toes for compelling the toes and the rack to rotate with the shaft, a pinion coactive with the rack, an index actuated by the pinion, a cup-shaped spring-retaining collar adjustably fixed on the shaft, and a coiled thrust spring surrounding the shaft and acting between the collar and the rack to press the toes toward the wipers and to resist the centrifugal force of the weights, such spring being provided at its end adjacent to the collar with an outwardly-flaring portion composed of larger coils fitting into the cup of the collar.

7. A speed indicator comprising a rotating shaft, a governor-head fixed on the shaft, rotatively balanced centrifugal weights, arms supporting the weights and pivoted on the governor-head, the axes of the pivots being substantially at right angles to a plane occupied by the axis of the shaft, wipers carried by the arms, a cylindrical rack slidable longitudinally on the shaft, toes carried by the rack and adapted to coact with the wipers, guides extending from the governor-head and engaging laterally with the toes for compelling the toes and the rack to rotate with the shaft, a pinion coactive with the rack, an index actuated by the pinion, a cup-shaped spring-retaining collar adjustably fixed on the shaft, and a coiled thrust spring surrounding the shaft and acting between the collar and the rack to press the toes toward the wipers and to resist the centrifugal force of the weights.

8. A speed indicator comprising a rotating shaft, rotatively balanced centrifugal weights, arms supporting the weights, means for pivotally connecting the arms with the shaft, the axes of the pivots being substantially at right angles to a plane occupied by the axis of the shaft, toes, levers carried by the arms and provided with convexly curved faces rocking on the surfaces of the toes to actuate the toes, speed-indicating means adapted and arranged to be actuated by the toes, and a spring for resisting the centrifugal movement of the weights.

9. A speed indicator comprising a rotating shaft, a centrifugal body, means for compelling the centrifugal body to rotate with the shaft, a toe, a lever adapted and arranged to be actuated by the centrifugal body and provided with a convexly curved surface rocking on the surface of the toe to actuate the toe, the toe and the lever being substantially co-extensive and the lever rocking on the toe substantially throughout the active length of the lever and of the toe and speed-indicating means adapted and arranged to be actuated by the toe.

10. A speed indicator comprising a rotating shaft, a centrifugal body, means for compelling the centrifugal body to rotate with the shaft, a toe, a lever adapted and arranged to be actuated by the centrifugal body and provided with a convexly curved surface rocking on the surface of the toe to actuate the toe, speed-indicating means adapted and arranged to be actuated by the toe, the toe and the lever being substantially co-extensive and the lever rocking on the toe substantially throughout the active length of the lever and of the toe and a spring for resisting the centrifugal movement of the centrifugal body.

11. A speed indicator comprising a rotating centrifugal body, a lever arm adapted and arranged to be actuated by the centrifugal body and provided with a convexly curved actuating surface, a contact piece co-extensive with the lever arm and along which the curved surface of the arm is adapted to rock substantially throughout its active length to progressively render active different portions of the arm, and speed-indicating means actuated by the contact piece.

12. A speed indicator comprising a rotating centrifugal body, a lever member adapted and arranged to be actuated by the centrifugal body, a contact member coactive with the lever member and substantially co-extensive therewith, one of such members being provided with a convexly curved contact surface adapted to rock substantially throughout its active length on the coacting surface of the other member to progressively render active different portions of the lever member, and speed-indicating means actuated by the contact member.

In testimony whereof I affix my signature in presence of two witnesses.

JOHN B. WARING.

Witnesses:
W<small>M</small>. A<small>SHLEY</small> K<small>ELLY</small>,
B<small>ERNARD</small> C<small>OWEN</small>.